(12) United States Patent
Hirasawa et al.

(10) Patent No.: US 8,842,386 B1
(45) Date of Patent: Sep. 23, 2014

(54) SPINDLE MOTOR AND DISK DRIVE APPARATUS

(71) Applicant: Nidec Corporation, Kyoto (JP)

(72) Inventors: Toshihiro Hirasawa, Kyoto (JP); Junya Mizukami, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/093,828

(22) Filed: Dec. 2, 2013

(30) Foreign Application Priority Data

Apr. 28, 2013 (JP) ................................ 2013-094847

(51) Int. Cl.
*G11B 33/14* (2006.01)
*H02K 7/08* (2006.01)

(52) U.S. Cl.
CPC ............. *G11B 18/2018* (2013.01); *H02K 7/08* (2013.01)
USPC ..................................................... 360/99.16

(58) Field of Classification Search
CPC .......... G11B 33/14; G11B 17/00; G11B 5/55; G11B 33/02; G11B 33/12; G11B 17/02
USPC .......... 360/99.16, 99.08, 99.13, 99.14, 99.15, 360/264.7, 97.19
See application file for complete search history.

(56) References Cited

U.S. PATENT DOCUMENTS

| | | | |
|---|---|---|---|
| 5,377,060 A * | 12/1994 | Nigam | 360/99.01 |
| 5,675,452 A * | 10/1997 | Nigam | 360/99.19 |
| 7,012,191 B1 | 3/2006 | Watanabe et al. | |
| 8,120,872 B2 | 2/2012 | Sekii et al. | |
| 8,363,352 B2 | 1/2013 | Kang | |
| 8,667,667 B1 | 3/2014 | Nguyen et al. | |
| 2006/0138886 A1 | 6/2006 | Ito et al. | |
| 2006/0265871 A1 | 11/2006 | Ito et al. | |
| 2007/0247010 A1 | 10/2007 | Ichizaki | |
| 2007/0278880 A1 | 12/2007 | Wada et al. | |
| 2008/0019038 A1 | 1/2008 | Xu et al. | |

(Continued)

FOREIGN PATENT DOCUMENTS

| | | |
|---|---|---|
| DE | 10 2013 014 229 A1 | 3/2014 |
| JP | 05-207717 A | 8/1993 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Allen T Cao
(74) *Attorney, Agent, or Firm* — Keating & Bennett, LLP

(57) ABSTRACT

A base plate of a spindle motor includes a bottom plate portion and a wall portion. The bottom plate portion extends perpendicularly or substantially perpendicularly to a rotation axis. The wall portion extends in an axial direction from a radially outer edge portion of the bottom plate portion. The bottom plate portion includes a cup portion and an outer bottom plate portion. The cup portion is arranged radially inward of the wall portion, and includes a recessed upper surface. The outer bottom plate portion is arranged to extend between the cup portion and the wall portion. The base plate includes a first member made of a first type of metallic material, and a second member made of a second type of metallic material having a Young's modulus greater than that of the first type of metallic material.

20 Claims, 14 Drawing Sheets

(56) References Cited

U.S. PATENT DOCUMENTS

| | | |
|---|---|---|
| 2008/0084142 A1 | 4/2008 | Ino et al. |
| 2010/0177627 A1 | 7/2010 | Ino et al. |
| 2012/0200957 A1 | 8/2012 | Yawata |

FOREIGN PATENT DOCUMENTS

| | | |
|---|---|---|
| JP | 05-070184 U | 9/1993 |
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.

Saeki et al.,"Base Unit", U.S. Appl. No. 13/770,374, filed Feb. 19, 2013.

Fujinawa et al., "Base Member, Motor, and Disk Drive Apparatus", U.S. Appl. No. 13/770,395, filed Feb. 19, 2013.

Matsumoto et al., "Base Unit, Motor and Disk Drive Apparatus", U.S. Appl. No. 13/770,355, filed Feb. 19, 2013.

Saeki et al , "Stopper, Motor, and Disk Drive Apparatus", U.S. Appl. No. 13/767,194, filed Feb. 14, 2013.

Masumi et al., "Base Plate, Base Unit, Motor, Disk Drive Apparatus and Method of Manufacturing the Base Plate", U.S. Appl. No. 13/789,974, filed Mar. 8, 2013.

Tatsumi et al., "Base Plate, Base Unit, Motor and Disk Drive Apparatus", U.S. Appl. No. 13/788,140, filed Mar. 7, 2013.

Shiraishi et al., "Motor and Disk Drive Apparatus", U.S. Appl. No. 13/783,733, filed Mar. 4, 2013.

Sato et al., "Spindle Motor and Disk Drive Apparatus", U.S. Appl. No. 13/780,447, filed Feb. 28, 2013.

Matsumoto et al., "Spindle Motor and Disk Drive Apparatus", U.S. Appl. No. 13/792,448, filed Mar. 11, 2013.

Matsumoto et al., "Spindle Motor and Disk Drive Apparatus", U.S. Appl. No. 13/792,400, filed Mar. 11, 2013.

Matsumoto et al., "Base Unit, Motor and Disk Drive Apparatus", U.S. Appl. No. 13/785,194, filed Mar. 5, 2013.

Matsumoto et al.,"Spindle Motor and Disk Drive Apparatus", U.S. Appl. No. 13/798,842, filed Mar. 13, 2013.

Tamaoka et al., "Motor and Disk Drive Apparatus", U.S. Appl. No. 13/564,900, filed Aug. 2, 2012.

Ishino et al., "Motor and Disk Drive Apparatus", U.S. Appl. No. 13/794,864, filed Mar. 12, 2013.

Sato et al., "Spindle Motor and Disk Drive Apparatus", U.S. Appl. No. 13/798,827, filed Mar. 13, 2013.

* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A disk drive apparatus, such as a hard disk drive, is known. A spindle motor arranged to rotate a disk is installed in the disk drive apparatus. A known disk drive apparatus is described, for example, in JP-A 2012-005339. The disk drive apparatus described in JP-A 2012-005339 includes a base arranged to support primary components of a motor (paragraph [0031] and FIG. 1 of JP-A 2012-005339).

In recent years, there has been an increasing demand for slim notebook PCs and tablet PCs. There has accordingly been a demand for a further reduction in the thickness of disk drive apparatuses installed in these PCs. Regarding the motor described in JP-A 2012-005339, for example, a reduction in the thickness of the disk drive apparatus can be achieved by reducing the axial thickness of a base plate arranged to support the motor.

However, a reduction in the axial thickness of the base plate results in a decrease in rigidity of the base plate. The decrease in the rigidity of the base plate, for example, increases the likelihood that a vibration or noise accompanying drive of the motor will occur. The vibration accompanying the drive of the motor causes a vibration of a disk, which may increase the likelihood that an error in reading and writing of data will occur.

SUMMARY OF THE INVENTION

According to a preferred embodiment of the present invention, a spindle motor preferably for use in a disk drive apparatus is provided. The spindle motor includes a base plate and a rotating portion. The rotating portion is rotatably supported by the base plate through a bearing mechanism. The base plate includes a bottom plate portion and a wall portion. The bottom plate portion is arranged to extend perpendicularly or substantially perpendicularly to a rotation axis of the rotating portion. The wall portion is arranged to extend in an axial direction from a radially outer edge portion of the bottom plate portion. The bottom plate portion includes a cup portion and an outer bottom plate portion. The cup portion includes an upper surface recessed on a radially inner side of the wall portion. The outer bottom plate portion is arranged to extend between the cup portion and the wall portion. The base plate includes a first member made of a first type of metallic material and a second member made of a second type of metallic material. The second type of metallic material has a Young's modulus greater than that of the first type of metallic material. The first member includes at least the wall portion. The second member includes a plate-shaped portion arranged to define at least a portion of the outer bottom plate portion. The plate-shaped portion is arranged to extend perpendicularly or substantially perpendicularly to the rotation axis.

According to a preferred embodiment of the present invention, at least a portion of the outer bottom plate portion is made of the second type of metallic material having a Young's modulus greater than that of the wall portion. This makes it possible to increase rigidity of the outer bottom plate portion while reducing the axial thickness of the outer bottom plate portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a rotation axis of a spindle motor is referred to by the term "axial direction", "axial", or "axially", that directions perpendicular to the rotation axis of the spindle motor are each referred to by the term "radial direction", "radial", or "radially", and that a direction along a circular arc centered on the rotation axis of the spindle motor is referred to by the term "circumferential direction", "circumferential", or "circumferentially". It is also assumed herein that an axial direction is a vertical direction, and that a side on which a cover is arranged with respect to a base plate is defined as an upper side. The shape of each member or portion and relative positions of different members or portions will be described based on the above assumptions. It should be noted, however, that the above definitions of the vertical direction and the upper side are not meant to restrict in any way the orientation of a spindle motor or a disk drive apparatus according to any preferred embodiment of the present invention when in use.

Also note that the wording "parallel direction" as used herein includes both parallel and substantially parallel directions. Also note that the wording "perpendicular direction" as used herein includes both perpendicular and substantially perpendicular directions.

Figure 1:
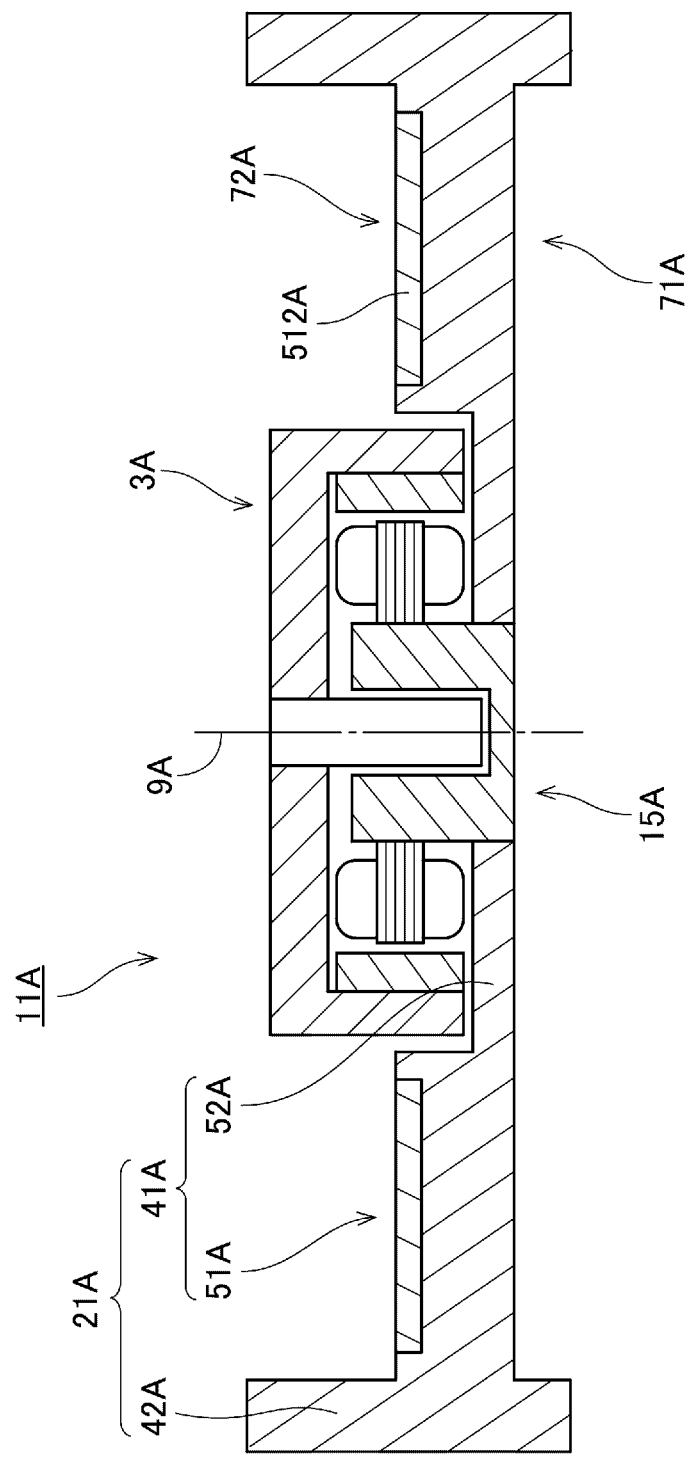
FIG. 1 is a vertical cross-sectional view of a spindle motor according to a first preferred embodiment of the present invention.

FIG. 1 is a vertical cross-sectional view of a spindle motor 11A according to a first preferred embodiment of the present invention. The spindle motor 11A is used in a disk drive apparatus. As illustrated in FIG. 1, the spindle motor 11A preferably includes a base plate 21A and a rotating portion 3A. The rotating portion 3A is rotatably supported by the base plate 21A through a bearing mechanism 15A.

The base plate 21A preferably includes a bottom plate portion 41A and a wall portion 42A. The bottom plate portion 41A is arranged to extend perpendicular to a rotation axis 9A of the rotating portion 3A. The wall portion 42A is arranged to extend in an axial direction from a radially outer edge portion of the bottom plate portion 41A. The bottom plate portion 41A includes an outer bottom plate portion 51A and a cup portion 52A. The cup portion 52A is arranged radially inward of the wall portion 42A. An upper surface of the cup portion 52A is recessed downward. In other words, the upper surface of the cup portion 52A is recessed on a radially inner side of the wall portion 42A. The outer bottom plate portion 51A is arranged to extend between the cup portion 52A and the wall portion 42A.

The base plate 21A includes a first member 71A and a second member 72A. The first member 71A is made of a first type of metallic material. The second member 72A is made of a second type of metallic material. The second type of metallic material has a Young's modulus greater than that of the first type of metallic material.

The first member 71A preferably includes at least the wall portion 42A. The second member 72A preferably includes a plate-shaped portion 512A, which is arranged to define at least a portion of the outer bottom plate portion 51A. The plate-shaped portion 512A is arranged to extend perpendicular to the rotation axis 9A. Thus, regarding the base plate 21A of the spindle motor 11A, at least a portion of the outer bottom plate portion 51A is made of a second type of metallic material, which has a Young's modulus greater than that of the wall portion 42A. This makes it possible to increase rigidity of the outer bottom plate portion 51A while also reducing the axial thickness of the outer bottom plate portion 51A.

Figure 2:
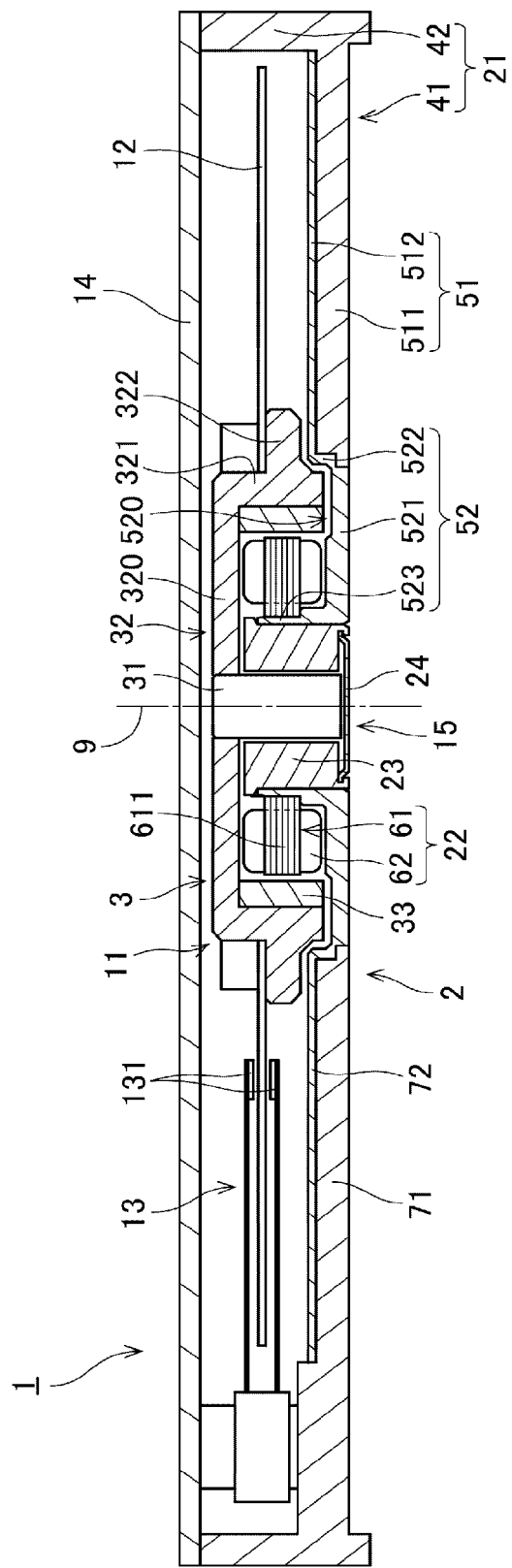
FIG. 2 is a vertical cross-sectional view of a disk drive apparatus according to a second preferred embodiment of the present invention.

FIG. 2 is a vertical cross-sectional view of a disk drive apparatus 1 according to a second preferred embodiment of the present invention. The disk drive apparatus 1 is arranged to rotate a magnetic disk 12 and perform reading and writing of information from or to the magnetic disk 12. As illustrated in FIG. 2, the disk drive apparatus 1 preferably includes a spindle motor 11, at least one magnetic disk 12, an access portion 13, and a cover 14.

The spindle motor 11 is arranged to rotate the magnetic disk 12 about a rotation axis 9 while supporting the magnetic disk 12. More specifically, a rotating portion 3 of the spindle motor 11 is arranged to rotate the magnetic disk 12 about the rotation axis 9 while supporting the magnetic disk 12. The spindle motor 11 preferably includes a base plate 21 arranged to extend perpendicular to the rotation axis 9. The base plate 21 preferably is box-shaped or substantially box-shaped with an upper opening. An upper portion of the base plate is covered with the cover 14. More specifically, an upper opening of the base plate 21 is covered with the cover 14. That is, the base plate 21 and the cover 14 are arranged to together define a case. The rotating portion 3 of the spindle motor 11, the magnetic disk 12, and the access portion 13 are accommodated in the case. The access portion 13 is arranged to move heads 131 along recording surfaces of the magnetic disk 12 to perform the reading and writing of information from or to the magnetic disk 12.

Note that the number of magnetic disks 12 included in the disk drive apparatus 1 may be more than one if desired. Also note that the access portion 13 may be arranged to perform only one of the reading and writing of information from or to the magnetic disk 12.

Next, the spindle motor 11 used in the disk drive apparatus 1 will be further described below. As illustrated in FIG. 2, the spindle motor 11 includes a stationary portion 2 and the rotating portion 3. The rotating portion 3 is supported to be rotatable with respect to the stationary portion 2.

The stationary portion 2 according to the present preferred embodiment preferably includes the base plate 21, a stator 22, a sleeve 23, and a cap 24.

The base plate 21 preferably includes a bottom plate portion 41 and a wall portion 42. The bottom plate portion 41 is arranged below all of the rotating portion 3, the magnetic disk 12, and the access portion 13. The bottom plate portion 41 is preferably plate-shaped or substantially plate-shaped. The bottom plate portion 41 is arranged to extend perpendicular to the rotation axis 9. The wall portion 42 is arranged to extend both axially upward and axially downward from a radially outer edge portion of the bottom plate portion 41. The wall portion 42 preferably is tube-shaped or substantially tube-shaped, and is arranged to extend along a contour of the bottom plate portion 41. That is, the wall portion 42 is arranged to surround the radially outer edge portion of the bottom plate portion 41. An upper end portion of the wall portion 42 is preferably arranged to be in contact with a lower surface of the cover 14 with a gasket (not shown) intervening therebetween. Airtightness of an interior space of the disk drive apparatus 1 is thus maintained at a high level.

The bottom plate portion 41 preferably includes an outer bottom plate portion 51 and a cup portion 52. The outer bottom plate portion 51 is arranged to extend perpendicular to the rotation axis 9 between the rotation axis 9 and the wall portion 42. The outer bottom plate portion 51 is joined to the wall portion 42. The cup portion 52 is arranged radially inward of both the wall portion 42 and the outer bottom plate portion 51. The cup portion 52 is arranged around the rotation axis 9, and is joined to the outer bottom plate portion 51. An upper surface of the cup portion 52 preferably includes a recessed portion 520. The recessed portion 520 is recessed downward in the upper surface of the cup portion 52. The recessed portion 520 is recessed in an annular or substantially annular shape around the rotation axis 9 when viewed in the axial direction.

The cup portion 52 according to the present preferred embodiment preferably includes an inner bottom plate portion 521, an annular wall 522, and a bearing fitting portion 523. The inner bottom plate portion 521 is arranged radially inward of the outer bottom plate portion 51 and below coils 62, which will be described below. In addition, the inner bottom plate portion 521 is preferably annular or substantially annular when viewed in the axial direction. The inner bottom plate portion 521 is arranged to extend perpendicular to the rotation axis 9. The inner bottom plate portion 521 is arranged axially below an upper surface of the outer bottom plate portion 51. The inner bottom plate portion 521 is arranged to define at least a portion of a bottom portion of the cup portion 52. The annular wall 522 is preferably cylindrical or substantially cylindrical. The annular wall 522 is arranged to extend upward from a radially outer edge portion of the inner bottom plate portion 521. The annular wall 522 is arranged to circumferentially surround the inner bottom plate portion 521. The bearing fitting portion 523 is preferably cylindrical or substantially cylindrical. The bearing fitting portion 523 is arranged to extend upward from a radially inner edge portion of the inner bottom plate portion 521. The recessed portion 520 mentioned above is defined by an upper surface of the inner bottom plate portion 521, an inner circumferential surface of the annular wall 522, and an outer circumferential surface of the bearing fitting portion 523.

At least a portion of the stator 22 and at least a portion of the rotating portion 3 are accommodated in the recessed portion 520. A portion of the outer bottom plate portion 51 is arranged radially opposite portions of the stator 22 and the rotating portion 3. That is, the portion of the outer bottom plate portion 51 is preferably arranged at the same or substantially the same level as that of the portions of the stator 22 and the rotating portion 3. The axial dimension of the outer bottom plate portion 51, the stator 22, and the rotating portion 3 as a whole is thus reduced.

The stator 22 is arranged to generate magnetic flux in accordance with drive currents. The stator 22 preferably includes a stator core 61 and the coils 62. The stator core 61 is preferably defined, for example, by laminated steel sheets, i.e., electromagnetic steel sheets, such as, for example, silicon steel sheets, placed one upon another in the axial direction. The stator core 61 is fixed to the outer circumferential surface of the bearing fitting portion 523. The stator core 61 includes a plurality of teeth 611 arranged to project radially outward. Each coil 62 is defined by a conducting wire wound around a separate one of the teeth 611.

The sleeve 23 is preferably a cylindrical or substantially cylindrical member extending in the axial direction. A shaft 31 described below is inserted in a through hole of the sleeve 23. A lower portion of the sleeve 23 is accommodated radially inside the bearing fitting portion 523, and is preferably fixed to the bearing fitting portion 523 through, for example, an adhesive. An inner circumferential surface of the sleeve 23 is arranged radially opposite an outer circumferential surface of the shaft 31. A lower opening of the sleeve 23 is closed by the cap 24.

The rotating portion 3 according to the present preferred embodiment preferably includes the shaft 31, a hub 32, and a magnet 33.

The shaft 31 is arranged to extend in the axial direction through the through hole of the sleeve 23. A metal, such as stainless steel, is used as a material of the shaft 31, for example. An upper end portion of the shaft 31 is arranged to project upward from an upper surface of the sleeve 23. A lubricating fluid is arranged between the shaft 31 and each of the sleeve 23 and the cap 24. A polyolester oil or a diester oil, for example, is preferably used as the lubricating fluid. The shaft 31 is supported through the lubricating fluid to be rotatable with respect to the sleeve 23 and the cap 24 during drive of the spindle motor 11.

That is, in the present preferred embodiment, a bearing mechanism 15 is defined by the sleeve 23 and the cap 24, which are members of the stationary portion 2, the shaft 31, which is a member of the rotating portion 3, and the lubricating fluid arranged therebetween. The bearing mechanism 15 is arranged radially inside the bearing fitting portion 523. The rotating portion 3 is rotatably supported by the base plate 21 through the bearing mechanism 15.

The hub 32 preferably includes a hub body portion 320. The hub body portion 320 is preferably disk-shaped or substantially disk-shaped. The hub body portion 320 is arranged to extend radially outward around the rotation axis 9. A through hole is defined in a center or a substantial center of the hub body portion 320. An inner circumferential portion of the hub body portion 320, which defines the through hole, is fixed to the upper end portion of the shaft 31. The hub 32 further includes a cylindrical or substantially cylindrical first holding portion 321 and a second holding portion 322 arranged to extend radially outward from a lower end portion of the first holding portion 321. The first holding portion 321 is arranged to extend axially downward from a radially outer end portion of the hub body portion 320. The second holding portion 322 is arranged to extend radially outward from an outside surface of the first holding portion 321. The second holding portion 322 is annular or substantially annular. The magnetic disk 12 preferably includes a circular or substantially circular hole defined in a center thereof. An inner circumferential portion of the magnetic disk 12, which defines the circular or substantially circular hole, is arranged to be in contact with at least a portion of an outer circumferential surface of the first holding portion 321. Meanwhile, a lower surface of the magnetic disk 12 is arranged to be in contact with at least a portion of an upper surface of the second holding portion 322. The magnetic disk 12 is thus supported.

The magnet 33 is fixed to the hub 32 radially outside the stator 22. More specifically, the magnet 33 is fixed to an inner circumferential surface of the first holding portion 321. The magnet 33 according to the present preferred embodiment preferably is annular or substantially annular. An inner circumferential surface of the magnet 33 is arranged radially opposite a radially outer end surface of each of the teeth 611. In addition, the inner circumferential surface of the magnet 33 includes north and south poles arranged to alternate with each other in a circumferential direction.

Note that a plurality of magnets may alternatively be used in place of the annular magnet 33 if so desired. In the case where the plurality of magnets are used, the magnets are arranged in the circumferential direction such that north and south poles alternate with each other.

Regarding the spindle motor 11 as described above, once the drive currents are supplied from an external power supply to the coils 62, the magnetic flux is generated around the teeth 611. Then, interaction between the magnetic flux of the teeth 611 and that of the magnet 33 produces a circumferential torque, so that the rotating portion 3 is caused to rotate about the rotation axis 9 with respect to the stationary portion 2. The magnetic disk 12 supported by the hub 32 is caused to rotate about the rotation axis 9 together with the rotating portion 3.

Figure 3:
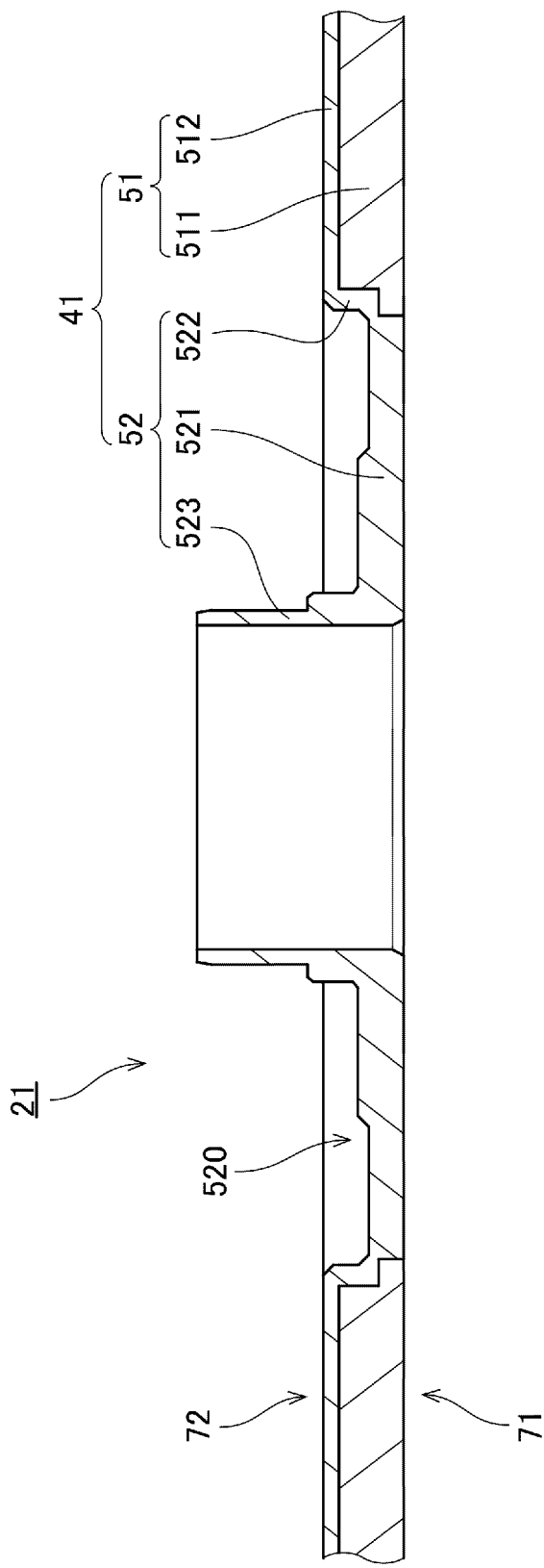
FIG. 3 is a partial vertical cross-sectional view of a base plate according to the second preferred embodiment of the present invention.
Figure 4:
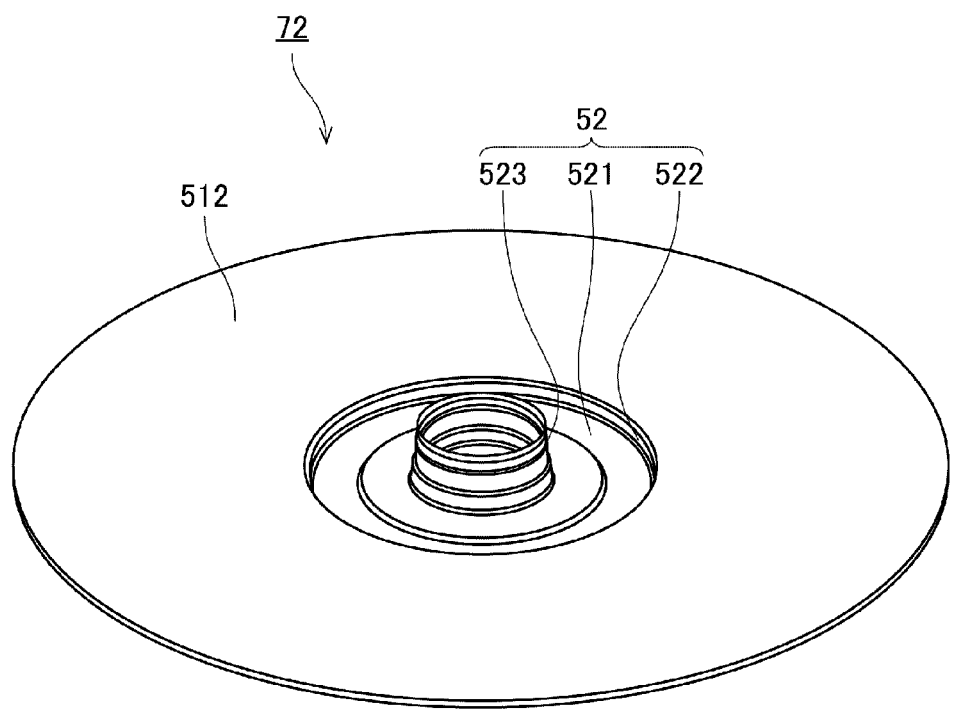
FIG. 4 is a perspective view of a second member according to the second preferred embodiment of the present invention.

Next, the structure of the base plate 21 will be described in more detail below. FIG. 3 is a partial vertical cross-sectional view of the base plate 21. FIG. 4 is a perspective view of a second member 72, which is a component of the base plate 21. Hereinafter, reference will be made to FIGS. 3 and 4 appropriately as well as FIG. 2.

The base plate 21 according to the present preferred embodiment preferably includes two members: a first member 71 and the second member 72. The first member 71 includes the wall portion 42 and a first plate-shaped portion 511. The first plate-shaped portion 511 is arranged to extend radially inward from the wall portion 42. That is, the first plate-shaped portion 511 is arranged to extend perpendicular to the rotation axis 9. Meanwhile, the second member 72 includes the cup portion 52 and a second plate-shaped portion 512. The second plate-shaped portion 512 is preferably plated-shaped or substantially plate-shaped. The second plate-shaped portion 512 is preferably plate-shaped or substantially annular, and is arranged to extend in the circumferential direction with the rotation axis 9 as a center. The second plate-shaped portion 512 is arranged to extend radially outward from an upper end portion of the annular wall 522 along an upper surface of the first plate-shaped portion 511. That is, the second plate-shaped portion 512 is arranged to extend perpendicular to the rotation axis 9. At least a portion of the second plate-shaped portion 512 is arranged axially opposite the first plate-shaped portion 511.

In the present preferred embodiment, the outer bottom plate portion 51 is defined by the first and second plate-shaped portions 511 and 512. That is, each of the first and second plate-shaped portions 511 and 512 is arranged to define a portion of the outer bottom plate portion 51.

The first member 71 is made of a first type of metallic material. An aluminum alloy, for example, is preferably used as the first type of metallic material. Specifically, the first member 71 can be obtained by casting of the aluminum alloy. Note, however, that, instead of the aluminum alloy, another metallic material, such as, for example, pure aluminum, pure magnesium, or a magnesium alloy, may be used as the first type of metallic material. Also note that the first member 71 may be produced by another process, such as, for example, press working, a cutting process, or forging, instead of the casting.

The second member 72 is made of a second type of metallic material. The second type of metallic material is arranged to have a Young's modulus greater than that of the first type of metallic material. A ferromagnetic or nonmagnetic stainless steel, for example, is preferably used as the second type of metallic material. Specifically, the second member 72 can be obtained by cutting of the stainless steel. Note, however, that, instead of the stainless steel, another metallic material, such as, for example, iron which is not an alloy, may be used as the second type of metallic material. Also note that the second member 72 may be produced by another process, such as, for example, press working or forging, instead of the cutting process.

Figure 5:
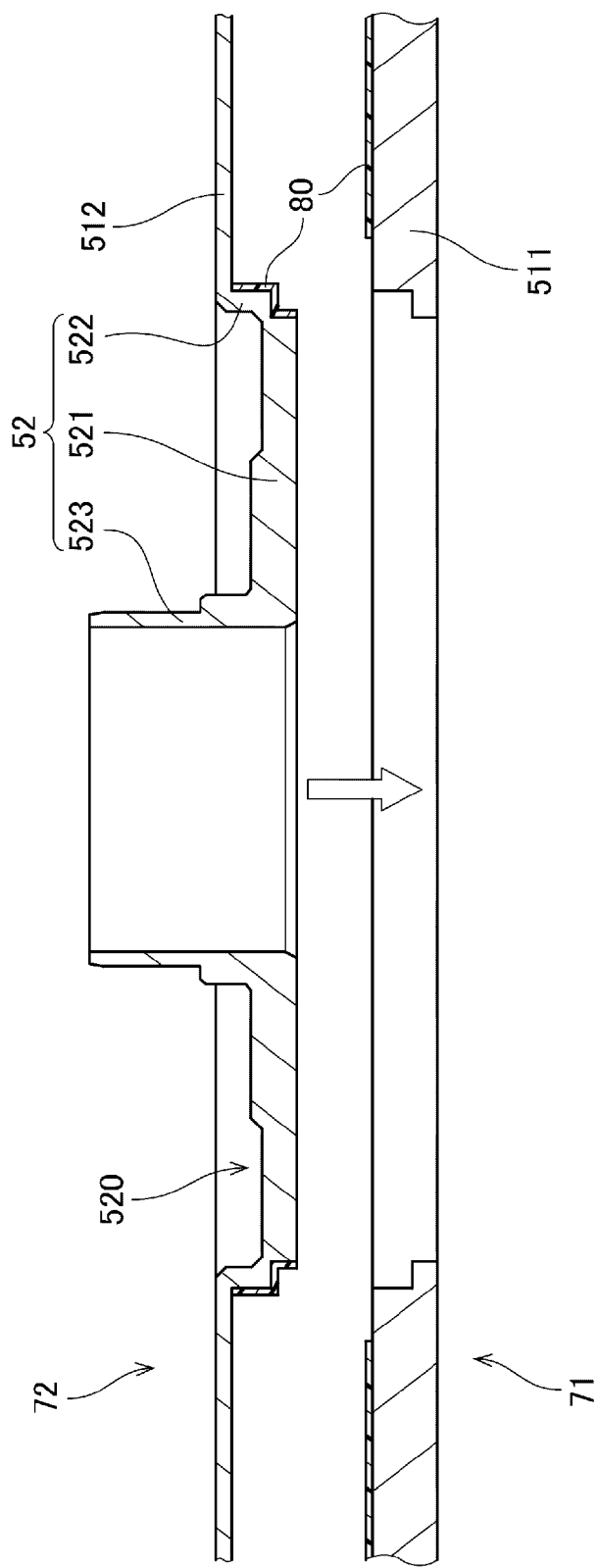
FIG. 5 is a diagram illustrating how the base plate according to the second preferred embodiment of the present invention is manufactured.

When the base plate 21 is produced, the second member 72 is press fitted to the first member 71 with adhesives 80 arranged to intervene between the first and second members 71 and 72 as illustrated in FIG. 5, for example. In the example illustrated in FIG. 5, the adhesives 80 are applied to an outer circumferential surface of the annular wall 522 and the upper surface of the first plate-shaped portion 511. Then, the second member 72 is brought closer to the first member 71 from above, and at least a portion of the cup portion 52 is press fitted in a through hole of the first plate-shaped portion 511. As a result, an outside surface of the annular wall 522 is arranged opposite to an inside surface of the first plate-shaped portion 511. The first member 71 is thus positioned radially with respect to the second member 72. Then, the first and second members 71 and 72 are fixed to each other.

A gap between the first and second members 71 and 72 is preferably sealed with the adhesive 80. More specifically, at least a portion of the adhesive 80 is arranged between the upper surface of the first plate-shaped portion 511 and a lower surface of the second plate-shaped portion 512. In addition, at least another portion of the adhesive 80 is preferably arranged between the outer circumferential surface of the annular wall 522 and a radially inner end portion of the first plate-shaped portion 511. Note that the adhesive 80 may be applied to an inner circumferential surface of the first plate-shaped portion 511, and also to the lower surface of the second plate-shaped portion 512.

As described above, the base plate 21 according to the present preferred embodiment preferably includes the first member 71 and the second member 72, which is made of the second type of metallic material having a Young's modulus greater than that of the first member 71. The second plate-shaped portion 512 of the second member 72 is arranged to define a portion of the outer bottom plate portion 51. An increase in rigidity of the outer bottom plate portion 51 is thus achieved while reducing the axial thickness of the outer bottom plate portion 51.

A reduction in the axial thickness of the outer bottom plate portion 51 leads to a reduction in the axial thickness of the disk drive apparatus 1. In addition, an increase in the rigidity of the outer bottom plate portion 51 leads to reductions in vibrations and noise which accompany the drive of the spindle motor 11. This in turn leads to a reduction in vibrations of the magnetic disk 12. Accordingly, the likelihood that an error will occur in reading and writing of data is reduced.

In particular, in the present preferred embodiment, the first plate-shaped portion 511 of the first member 71 and the second plate-shaped portion 512 of the second member 72 are arranged to axially overlap with each other in the outer bottom plate portion 51. In other words, the outer bottom plate portion 51 includes the first plate-shaped portion 511 of the first member 71 and the second plate-shaped portion 512 of the second member 72. Note that, in the present preferred embodiment described below, a plate-shaped portion corresponds to the second plate-shaped portion 512. Axial overlapping of the two members as described above reduces the likelihood that the outer bottom plate portion 51 will be axially deformed and distorted. Moreover, referring to FIG. 4, the second plate-shaped portion 512 according to the present preferred embodiment is annular or substantially annular in a plan view. The rigidity of the outer bottom plate portion 51 is thus increased throughout an entire circumferential extent thereof.

It is preferable that the upper surface of the outer bottom plate portion 51 should be flat in order to reduce air resistance acting on the magnetic disk 12 during driving of the spindle motor 11. On the other hand, a lower surface of the outer bottom plate portion 51 may include a raised or recessed portion, such as, for example, a rib or a groove. A wire or the like, for example, is preferably arranged on the raised or recessed portion of the lower surface of the outer bottom plate portion 51. In the present preferred embodiment, the first member 71 is preferably produced by casting. Therefore, the raised or recessed portion, such as, for example, the rib or the groove, can be easily defined in the lower surface of the first plate-shaped portion 511 when the first plate-shaped portion 511 is arranged below the second plate-shaped portion 512 as in the present preferred embodiment.

Moreover, in the present preferred embodiment, not only the second plate-shaped portion 512, but also the cup portion 52, is preferably made of the second type of metallic material. That is, each of the inner bottom plate portion 521, the annular wall 522, and the bearing fitting portion 523 is made of the second type of metallic material. This arrangement makes it possible to increase rigidity of the cup portion 52 while reducing the axial thickness of the inner bottom plate portion 521. In addition, this arrangement makes it possible to increase the rigidity of the cup portion 52 while reducing the radial thickness of the annular wall 522. Moreover, this arrangement makes it possible to increase the rigidity of the cup portion 52 while reducing the radial thickness of the bearing fitting portion 523.

A reduction in the thickness of each portion of the cup portion 52 leads to a reduction in the axial thickness of the spindle motor 11. Moreover, since a reduction in at least one of the thickness of the inner bottom plate portion 521 and the thickness of the bearing fitting portion 523 is achieved, an increase in the size of a space defined by the inner bottom plate portion 521, the bearing fitting portion 523, and the hub 32 is achieved. That is, both a reduction in the height of the spindle motor 1 and an increase in the size of a space in which the coils 62 are arranged in the spindle motor 1 are achieved. This makes it possible to increase the number of turns of each coil 62 to increase power of the spindle motor 11. Moreover, an increase in the rigidity of the cup portion 52 leads to a further reduction in vibrations of the base plate 21 in the vicinity of the bearing mechanism 15.

Furthermore, in the second member 72 according to the present preferred embodiment, at least a portion of the outer bottom plate portion 51, the inner bottom plate portion 521, and the annular wall 522 are defined together as a single monolithic body. In more detail, the second plate-shaped portion 512, the inner bottom plate portion 521, the annular wall 522, and the bearing fitting portion 523 are not separate members but are defined by the single second member 72. This arrangement makes it possible to increase rigidity of the second plate-shaped portion 512 while reducing the number of parts of the base plate 21. Moreover, this arrangement makes it possible to increase rigidity of the inner bottom plate portion 521 while reducing the number of parts of the base plate 21. Furthermore, this arrangement makes it possible to increase rigidity of the annular wall 522 while reducing the number of parts of the base plate 21. Furthermore, this arrangement makes it possible to increase rigidity of the bearing fitting portion 523 while reducing the number of parts of the base plate 21. Furthermore, since the second member 72 is a single unitary member, a production cost is reduced compared to the case where the second member 72 is defined by separate members.

As the second type of metallic material, of which the second member 72 is made, an austenitic stainless steel, such as SUS303 or SUS304, a martensite stainless steel, such as SUS420, or a ferritic stainless steel, such as SUS430, for example, may preferably be used.

Note here that the ferritic stainless steel has a Young's modulus greater than that of the austenitic stainless steel. Therefore, when the ferritic stainless steel is used as the second type of metallic material, an additional increase in the rigidity of the base plate 21 is achieved.

Meanwhile, a coefficient of thermal expansion of the austenitic stainless steel is closer to that of aluminum than is that of the ferritic stainless steel or that of the martensite stainless steel. Therefore, when the austenitic stainless steel is used as the second type of metallic material, a difference in the amount of heat deformation between the first and second members 71 and 72 is reduced. Accordingly, the likelihood of a deformation of the base plate 21 due to the difference in the amount of heat deformation is reduced.

While preferred embodiments of the present invention have been described above, it is to be understood that the present invention is not limited to the above-described preferred embodiments.

Figure 6:
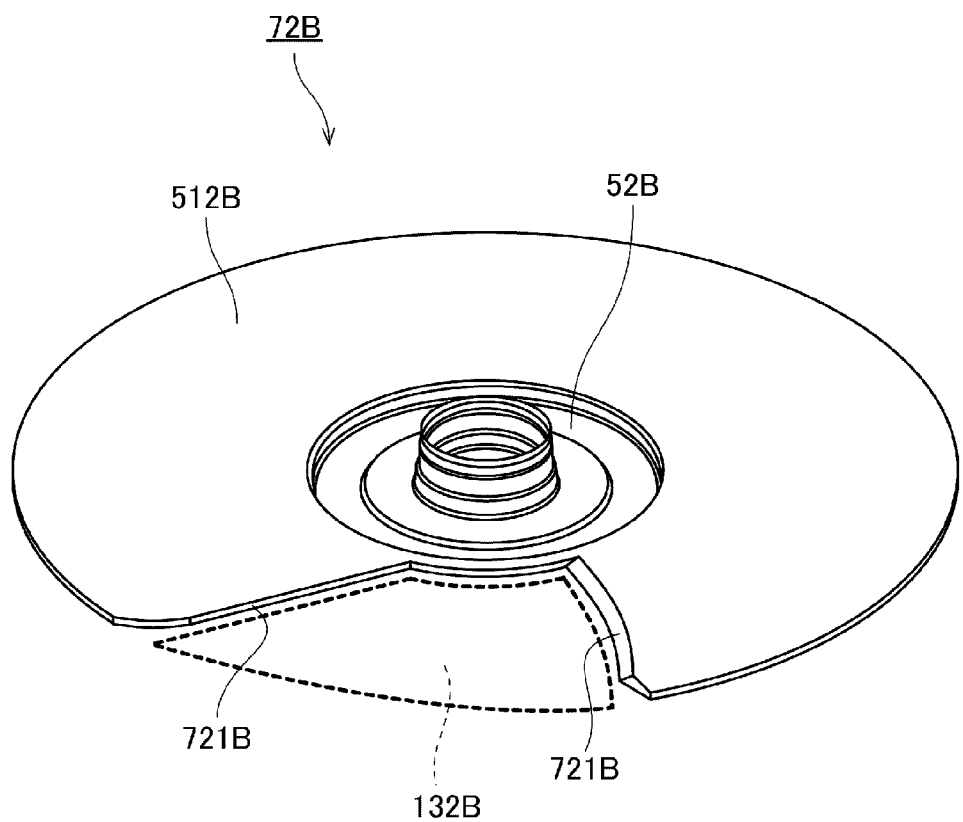
FIG. 6 is a perspective view of a second member according to an example modification of the second preferred embodiment of the present invention.

FIG. 6 is a perspective view of a second member 72B according to an example modification of the above-described second preferred embodiment. In the example modification illustrated in FIG. 6, a portion of a second plate-shaped portion 512B is cut out. As a result, the second plate-shaped portion 512B preferably is C-shaped or substantially C-shaped in a plan view. That is, the second plate-shaped portion 512B includes a pair of circumferential edges 721B each of which extends in a radial direction on a radially outer side of a cup portion 52B. The pair of circumferential edges 721B are arranged circumferentially opposite each other. The second plate-shaped portion 512B is arranged to extend in a fan-shaped or substantially fan-shaped configuration from one to the other of the pair of circumferential edges 721B. In other words, the circumferential dimension of the second plate-shaped portion 512B measured from one to the other of the pair of circumferential edges 721B (i.e., the dimension of the second plate-shaped portion 512B measured from one circumferential end to the other) is arranged to gradually increase with increasing distance from a rotation axis.

A region 132B is arranged circumferentially between one and the other of the circumferential edges 721B. A contour of the region 132B preferably is fan-shaped or substantially fan-shaped in a plan view. Note that the contour of the region 132B may not necessarily be fan-shaped, but may be in any other desirable shape.

The above arrangement makes it possible to arrange the second plate-shaped portion 512B such that no portion of the second plate-shaped portion 512B is arranged in the region 132B where a head passes when a disk drive apparatus has a spindle motor installed therein. This makes it possible to arrange the second plate-shaped portion 512B and the head at the same axial position at least in part. This results in an additional reduction in the axial dimension of the disk drive apparatus.

Figure 7:
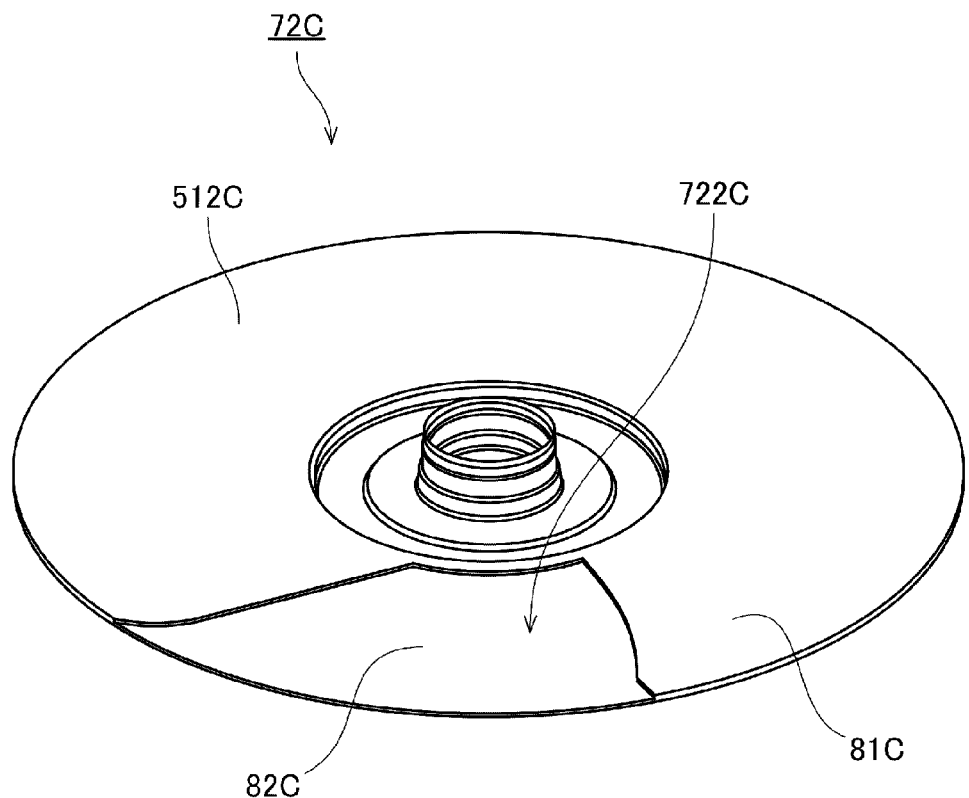
FIG. 7 is a perspective view of a second member according to an example modification of the second preferred embodiment of the present invention.

FIG. 7 is a perspective view of a second member 72C according to another example modification of the above-described second preferred embodiment. In the example modification illustrated in FIG. 7, a recessed portion 722C is defined in a portion of a second plate-shaped portion 512C. As a result, an upper surface of the second plate-shaped portion 512C includes a fan-shaped or substantially fan-shaped first upper surface 81C and a fan-shaped or substantially fan-shaped second upper surface 82C. The second upper surface 82C is a bottom portion of the recessed portion 722C. The first and second upper surfaces 81C and 82C are circumferentially continuous with each other. The second upper surface 82C is arranged at a level lower than that of the first upper surface 81C.

The above arrangement allows the recessed portion 722C to be arranged in a region where a head passes when a disk drive apparatus has a spindle motor installed therein. It is therefore possible to arrange the second plate-shaped portion 512C and the head at the same axial position at least in part. This results in an additional reduction in the axial dimension of the disk drive apparatus.

Figure 8:
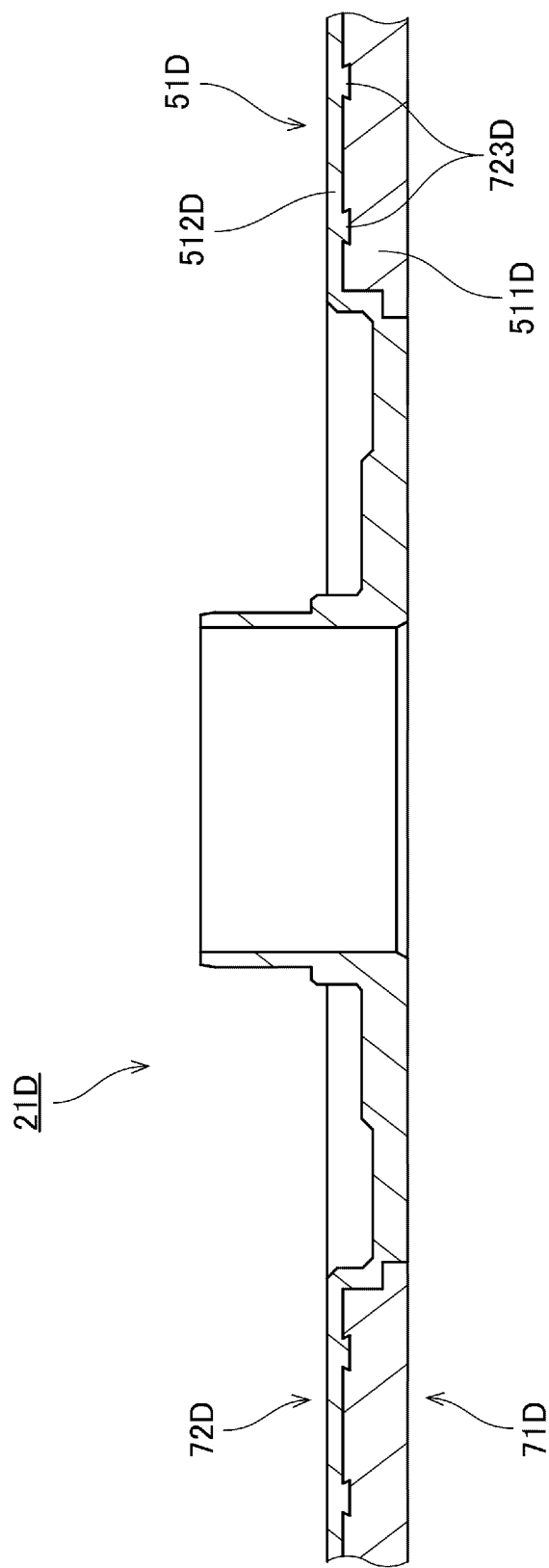
FIG. 8 is a partial vertical cross-sectional view of a base plate according to an example modification of the second preferred embodiment of the present invention.
Figure 9:
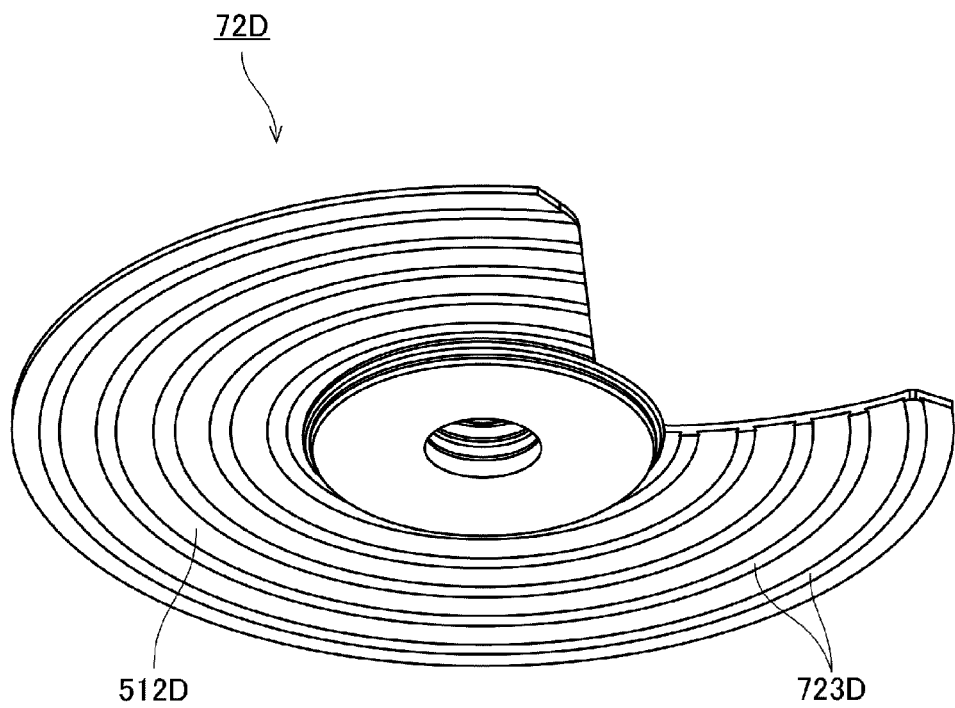
FIG. 9 is a perspective view of a second member according to an example modification of the second preferred embodiment of the present invention.

FIG. 8 is a partial vertical cross-sectional view of a base plate 21D according to yet another example modification of the above-described second preferred embodiment. FIG. 9 is a perspective view of a second member 72D, which is a component of the base plate 21D, as viewed obliquely from below. In the example modification illustrated in FIGS. 8 and 9, a plurality of ribs 723D are preferably arranged in a second plate-shaped portion 512D. Each rib 723D is arranged to project in an axial direction. Specifically, in the example modification illustrated in FIGS. 8 and 9, each of the ribs 723D is arranged to project axially downward from a lower surface of the second plate-shaped portion 512D. In this example modification, the number of ribs 723D is preferably five, for example. Each rib 723D is arranged to extend in a circumferential direction or in a radial direction. In the example modification illustrated in FIG. 9, each rib 723D is arranged to extend in the circumferential direction. In addition, the ribs 723D are preferably arranged at regular intervals in the radial direction. In the case where the ribs 723D are arranged in the second plate-shaped portion 512D as described above, the ribs 723D provide an additional improvement in rigidity of the second plate-shaped portion 512D, and hence an additional improvement in rigidity of an outer bottom plate portion 51D as well. Note that the ribs 723D may not necessarily be arranged at regular intervals in the radial direction. Also note that the number of ribs 723D may be modified as appropriate.

When the base plate 21D illustrated in FIG. 8 is manufactured, the second member 72D is arranged in a mold beforehand, and thereafter the first type of metallic material in a molten state is poured into the mold, for example. Then, the first type of metallic material is cooled and solidified, so that a first member 71D is obtained. That is, the first member 71D is preferably produced by casting with the second member 72D as an insert component. As a result of the solidification of the first type of metallic material, the first and second members 71D and 72D are fixed to each other.

Moreover, in the example modification illustrated in FIGS. 8 and 9, the radial width of each rib 723D is preferably arranged to gradually increase in a downward direction. After the casting, each rib 723D of the second member 72D is enveloped and held by the first type of metallic material which makes up a first plate-shaped portion 511D. As a result, the first and second members 71D and 72D are firmly fixed to each other to prevent separation of the first and second members 71D and 72D.

Furthermore, in the example modification illustrated in FIG. 8, an upper surface of the second plate-shaped portion 512D is exposed at an upper surface of the outer bottom plate portion 51D, while the plurality of ribs 723D are arranged in a lower surface of the second plate-shaped portion 512D. According to this arrangement, each of the ribs 723D preferably does not project in the upper surface of the outer bottom plate portion 51D. Therefore, the ribs 723D do not cause an air resistance acting on a magnetic disk during drive of a spindle motor.

Figure 10:
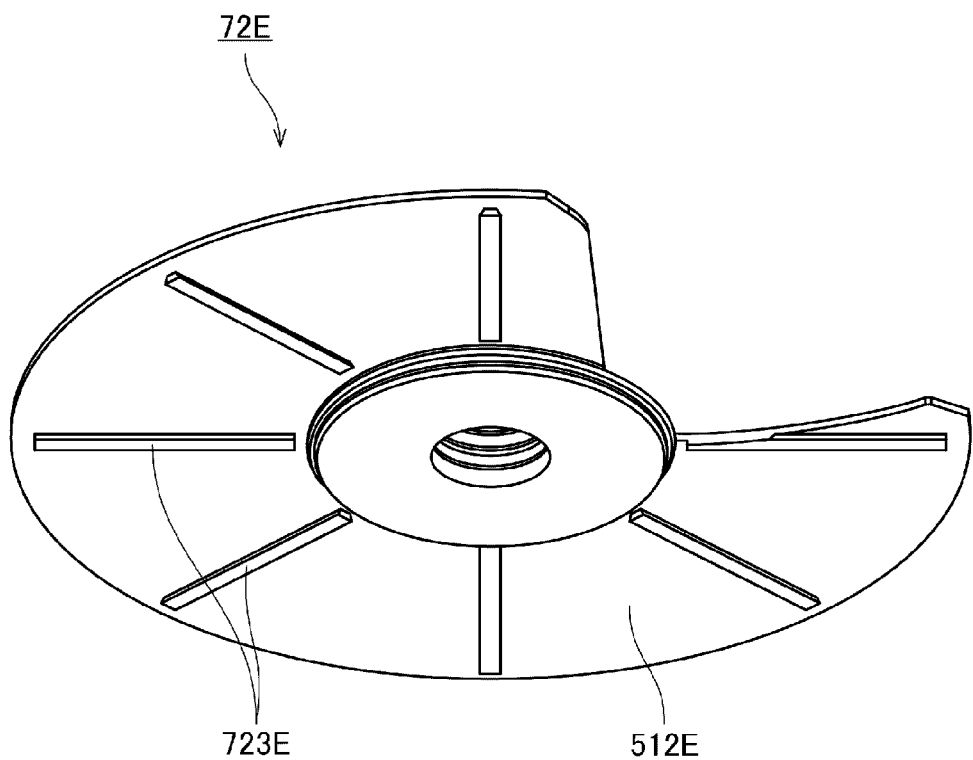
FIG. 10 is a perspective view of a second member according to an example modification of the second preferred embodiment of the present invention.

FIG. 10 is a perspective view of a second member 72E according to yet another example modification of the above-described second preferred embodiment as viewed obliquely from below. In the example modification illustrated in FIG. 10, a plurality of ribs 723E each of which projects axially downward and extends in a radial direction are arranged in a lower surface of a second plate-shaped portion 512E. In the example modification illustrated in FIG. 10, the number of ribs 723E is preferably seven, for example. The ribs 723E are preferably arranged at regular intervals in a circumferential direction. Provision of the ribs 723E extending in the radial directions, in particular, prevents a deformation of the second plate-shaped portion 512E in a direction crossing any radial direction. Therefore, an additional reduction in the likelihood of a bend of the second plate-shaped portion 512E with a rotation axis as a center is achieved. Note that the ribs 723E may be arranged at irregular intervals. Also note that the number of ribs 723E may be modified to be any desirable number as appropriate.

Figure 11:
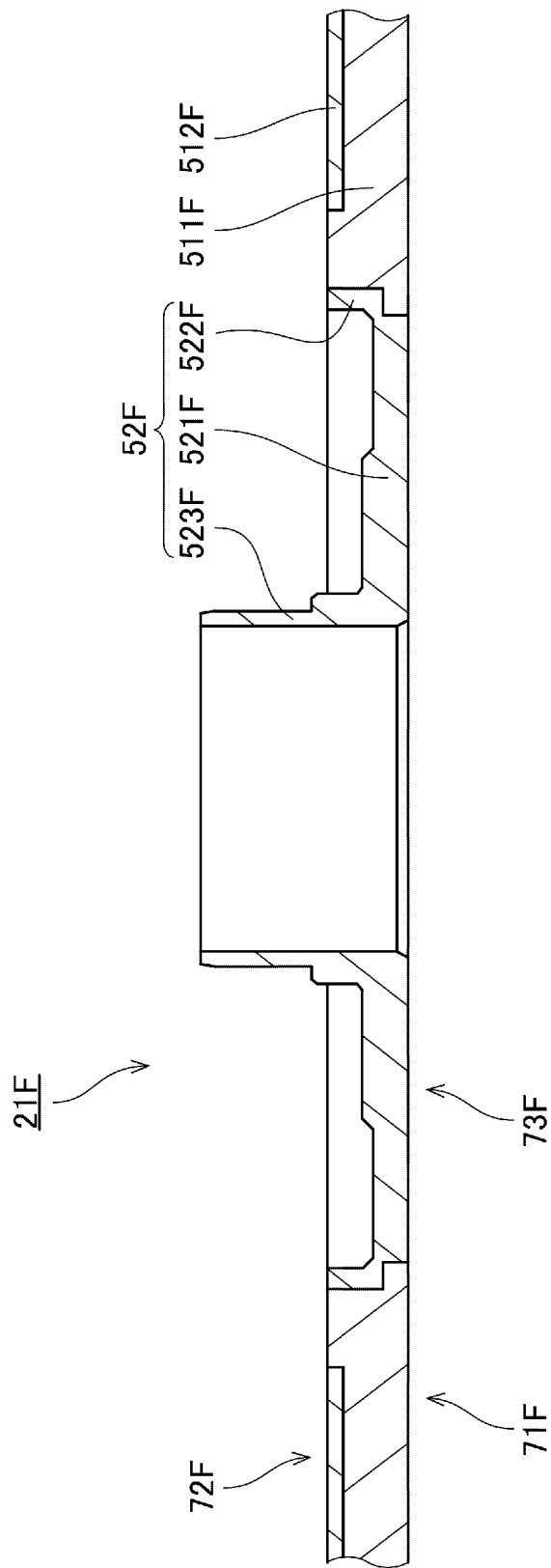
FIG. 11 is a partial vertical cross-sectional view of a base plate according to an example modification of the second preferred embodiment of the present invention.

FIG. 11 is a partial vertical cross-sectional view of a base plate 21F according to yet another example modification of the above-described second preferred embodiment. The base plate 21F illustrated in FIG. 11 preferably includes three members: a first member 71F, a second member 72F, and a third member 73F. That is, the second member 72F, which includes a second plate-shaped portion 512F, and the third member 73F, which includes a cup portion 52F, are provided by separate members. At an upper surface of the base plate 21F, at least a portion of the first member 71F is arranged between the second and third members 72F and 73F. In more detail, at least a portion of the first member 71F is exposed at the upper surface of the base plate 21F.

Even in the case where the base plate 21F includes three members as described above, the first, second, and third members 71F, 72F, and 73F may be fixed to one another by various processes, such as, for example, press fitting, adhesion, and insert molding, as described above to define the single base plate 21F. A material of the third member 73F may be either the second type of metallic material or another type of metallic material. Note, however, that the material of the third member 73F is preferably a metallic material having a Young's modulus greater than that of the first type of metallic material in order to increase rigidity of the cup portion 52F while reducing the axial thickness of an inner bottom plate portion 521F, the radial thickness of an annular wall 522F, or the radial thickness of a bearing fitting portion 523F. In other words, the third member 73F, which includes the cup portion 52F, is preferably made of a metallic material having a Young's modulus greater than that of the first type of metallic material. In still other words, each of the inner bottom plate portion 521F, the annular wall 522F, and the bearing fitting portion 523F is preferably defined by a metallic material having a Young's modulus greater than that of the first type of metallic material.

In the example modification illustrated in FIG. 11, the second plate-shaped portion 512F and the cup portion 52F are made of optimum materials in accordance with their respective desired strengths. For example, the first type of metallic material, the second type of metallic material, and the material of the third member 73F may be pure aluminum or an aluminum alloy, an austenite stainless steel, and a ferrite or martensite stainless steel, respectively. In other words, the third member 73F, which includes the cup portion 52F, may be made of the ferrite or martensite stainless steel. In still other words, each of the inner bottom plate portion 521F, the annular wall 522F, and the bearing fitting portion 523F may be made of the ferrite or martensite stainless steel. A particular increase in the rigidity of the cup portion 52F is thus achieved while a difference in the amount of heat deformation between a first plate-shaped portion 511F and the second plate-shaped portion 512F is reduced.

Figure 12:
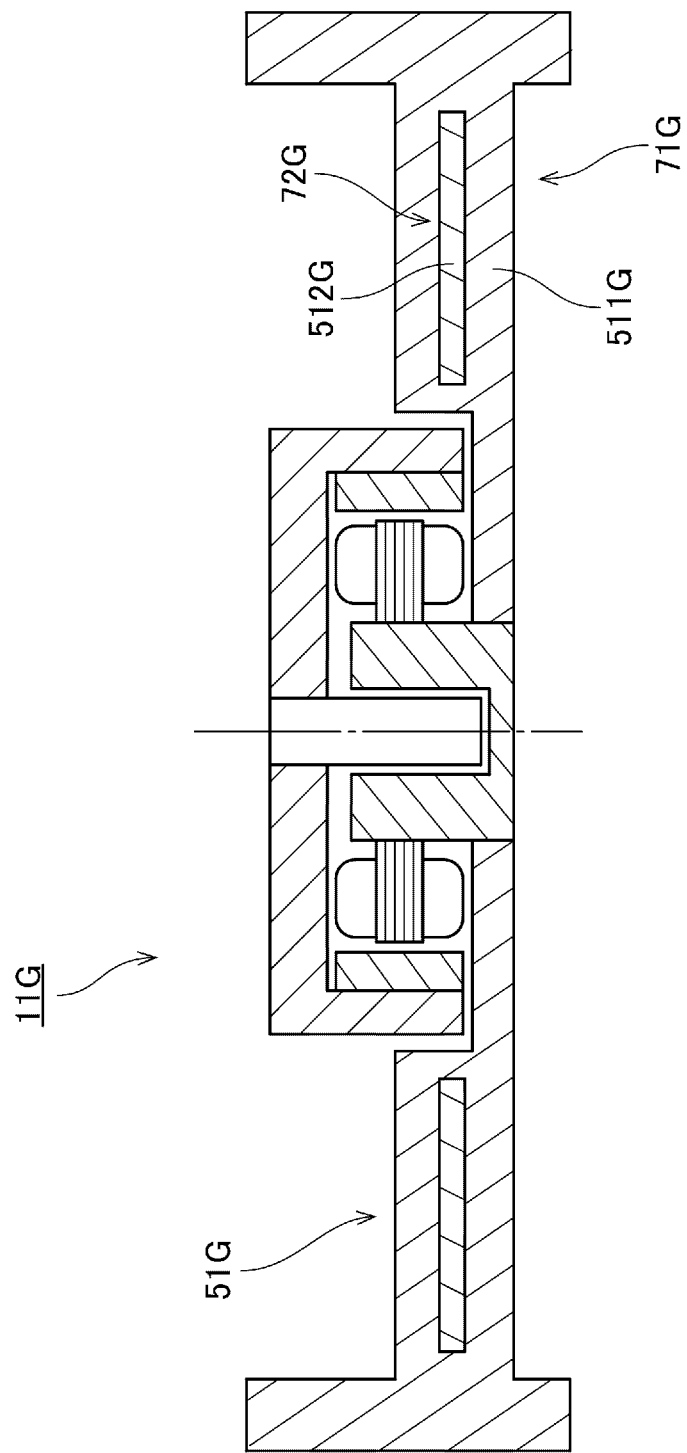
FIG. 12 is a vertical cross-sectional view of a spindle motor according to an example modification of the first preferred embodiment of the present invention.

FIG. 12 is a vertical cross-sectional view of a spindle motor 11G according to an example modification of the above-described first preferred embodiment. In the example modification illustrated in FIG. 12, a second member 72G is defined by only a second plate-shaped portion 512G. Moreover, the second member 72G is embedded within a first plate-shaped portion 511G. That is, both an upper surface and a lower surface of the second plate-shaped portion 512G are covered with the first plate-shaped portion 511G. In other words, both the upper surface and the lower surface of the second plate-shaped portion 512G are covered with a first member 71G. In addition, both an inside surface and an outside surface of the second plate-shaped portion 512G are covered with the first plate-shaped portion 511G. In other words, both the inside surface and the outside surface of the second plate-shaped portion 512G are covered with the first member 71G. Even with this structure, both a reduction in the axial thickness of an outer bottom plate portion 51G and an increase in rigidity of the outer bottom plate portion 51G are achieved by a portion of the outer bottom plate portion 51G being defined by the second member 72G having a Young's modulus greater than that of the first member 71G.

Figure 13:
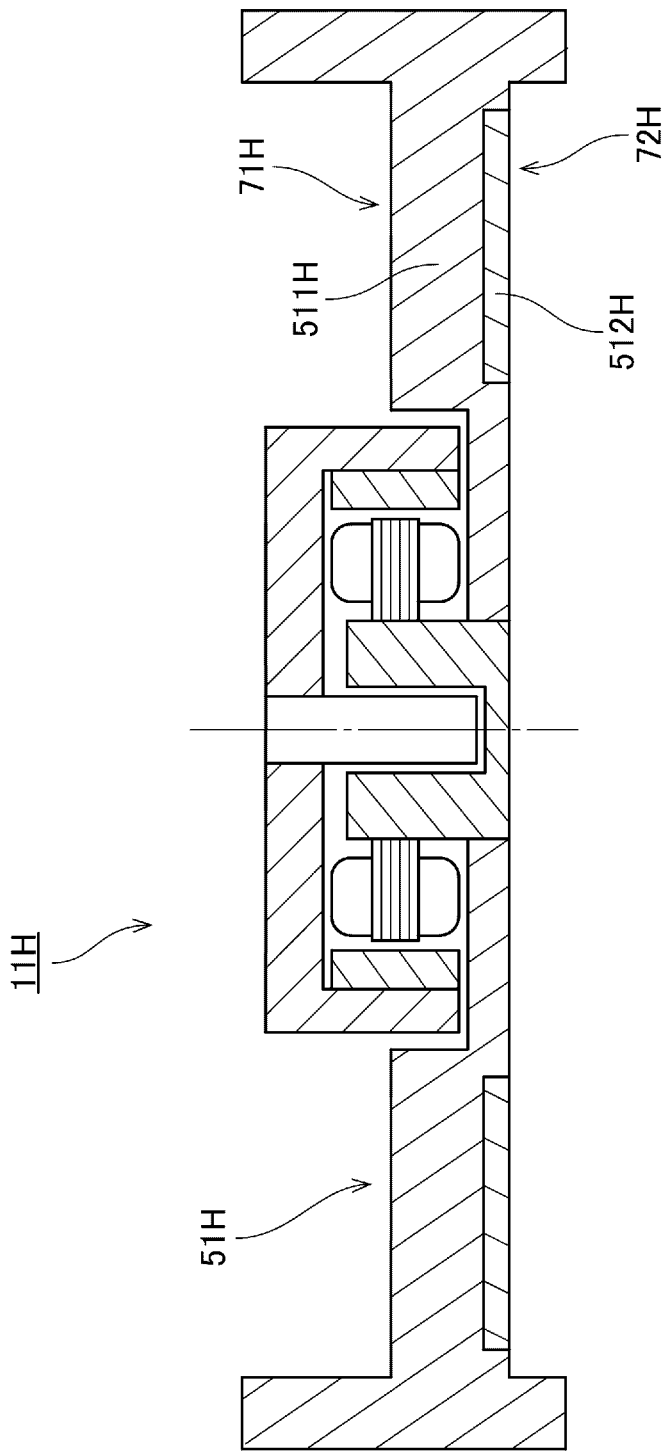
FIG. 13 is a vertical cross-sectional view of a spindle motor according to an example modification of the first preferred embodiment of the present invention.

FIG. 13 is a vertical cross-sectional view of a spindle motor 11H according to another example modification of the above-described first preferred embodiment. In the example modification illustrated in FIG. 13, a second member 72H is defined by only a second plate-shaped portion 512H. In addition, the second member 72H is arranged below a first plate-shaped portion 511H. That is, an upper surface of the second plate-shaped portion 512H is covered with the first plate-shaped portion 511H. Meanwhile, a lower surface of the second plate-shaped portion 512H is exposed at a lower surface of an outer bottom plate portion 51H. Both an inside surface and an outside surface of the second plate-shaped portion 512H are covered with the first plate-shaped portion 511H. Even with this structure, both a reduction in the axial thickness of the outer bottom plate portion 51H and an increase in rigidity of the outer bottom plate portion 51H are achieved by a portion of the outer bottom plate portion 51H being defined by the second member 72H having a Young's modulus greater than that of a first member 71H.

Note that each of the second plate-shaped portions illustrated in FIGS. 12 and 13 may be arranged to include a plurality of ribs. In this case, in other words, the plurality of ribs may be provided in at least one of the upper surface and the lower surface of the second plate-shaped portion. Specifically, each of the ribs may be arranged to project axially downward from the lower surface of the second plate-shaped portion, or may be arranged to project axially upward from the upper surface of the second plate-shaped portion. The ribs preferably do not cause an air resistance acting on the rotating magnetic disk unless the ribs project at an upper surface of the outer bottom plate portion. In more detail, the ribs do not cause an air resistance acting on the rotating magnetic disk unless the ribs project axially upward from the upper surface of the outer bottom plate portion.

Figure 14:
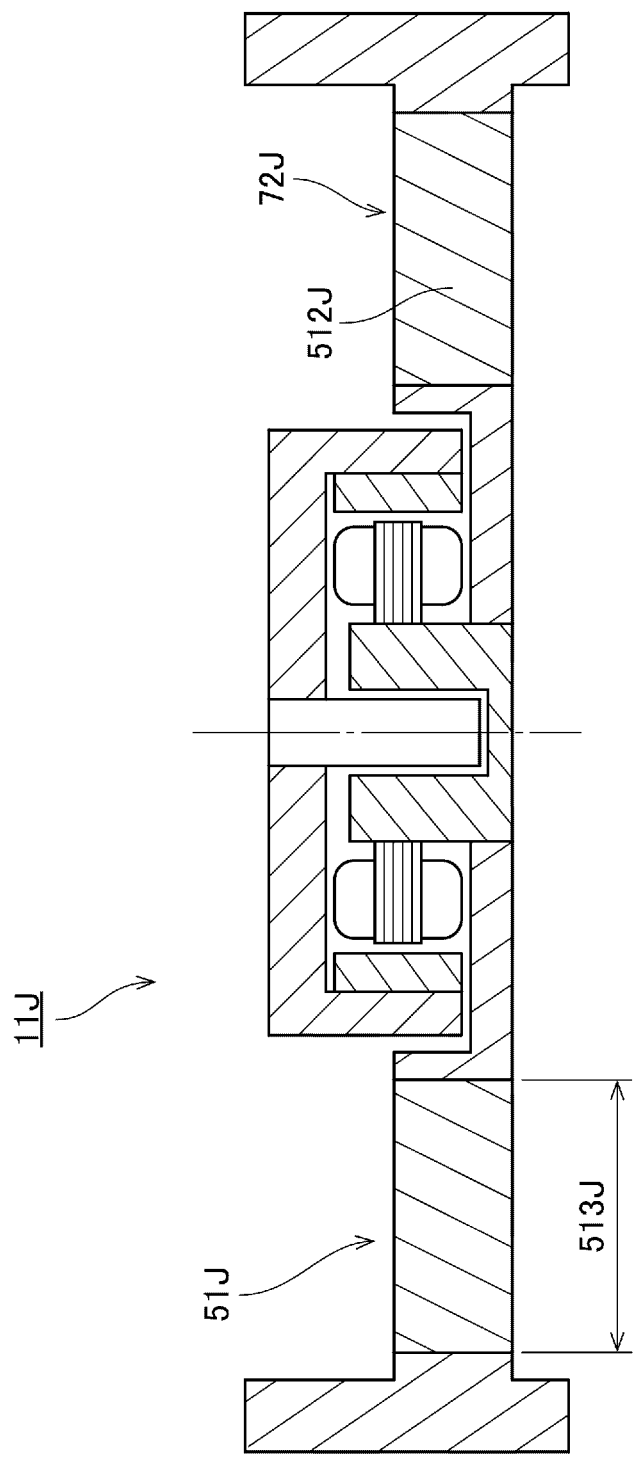
FIG. 14 is a vertical cross-sectional view of a spindle motor according to an example modification of the first preferred embodiment of the present invention.

FIG. 14 is a vertical cross-sectional view of a spindle motor 11J according to yet another example modification of the above-described first preferred embodiment. In the example modification illustrated in FIG. 14, a second member 72J is defined by only a second plate-shaped portion 512J. In addition, the second member 72J is arranged to extend from an upper surface to a lower surface of an outer bottom plate portion 51J. That is, an upper surface of the second member 72J is exposed at the upper surface of the outer bottom plate portion 51J, while a lower surface of the second member 72J is exposed at the lower surface of the outer bottom plate portion 51J. Accordingly, in a plan view, the outer bottom plate portion 51J includes a strengthened region 513J which is made of the second type of metallic material from an upper surface to a lower surface thereof. In other words, the second member 72J includes the strengthened region 513J arranged to extend from the upper surface to the lower surface of the outer bottom plate portion 51J. An additional increase in rigidity of the outer bottom plate portion 51J is thus achieved.

Base plates according to preferred embodiments of the present invention are applicable to a variety of disk drive apparatuses. The disk drive apparatuses may be arranged to rotate disks other than magnetic disks, such as, for example, optical disks. Note, however, that various preferred embodiments of the present invention is able to achieve a reduction in the axial thickness of the disk drive apparatus, in particular. Therefore, preferred embodiments of the present invention are particularly suitable for base plates used in disk drive apparatuses designed for slim notebook PCs and tablet PCs. Specifically, preferred embodiments of the present invention are particularly suitable for base plates used in 2.5" disk drive apparatuses having a thickness of 7 mm or less. Spindle motors according to preferred embodiments of the present invention may be used as other types of motors, such as fan motors, or may be used in other types of electronic devices.

The spindle motors according to each of the above-described preferred embodiments are preferably so-called outer-rotor spindle motors, in which the magnet is arranged radially outside the stator. Note, however, that spindle motors according to a preferred embodiment of the present invention may be so-called inner-rotor spindle motors, in which a magnet is arranged radially inside a stator.

The spindle motors according to each of the above-described preferred embodiments are preferably so-called rotating-shaft spindle motors, in which the sleeve belongs to the stationary portion while the shaft belongs to the rotating portion. Note, however, that a spindle motor according to a preferred embodiment of the present invention may be a so-called fixed-shaft spindle motor, in which the shaft belongs to the stationary portion while the sleeve belongs to the rotating portion. In the case of the fixed-shaft spindle motor, the shaft may be fixed to the bearing fitting portion.

In the above-described second preferred embodiment, the first and second members are preferably fixed to each other through press fitting and the adhesive. Meanwhile, in the example modification illustrated in FIG. 8, the first and second members are preferably fixed to each other through the insert molding. Note, however, that the first and second members may be fixed to each other by another method. For example, the first and second members may be fixed to each other not through the press fitting but instead by inserting the second member in the first member and arranging the adhesive in a gap between the first and second members. Also note that the first and second members may be fixed to each other through crimping of a portion of the first member or a portion of the second member.

Also note that the structure of the bearing mechanism may be different from the structure thereof as illustrated in the accompanying drawings of the present application. Also note that the detailed shape of any member of the spindle motor may be different from the shape thereof as illustrated in the accompanying drawings of the present application.

Also note that features of the above-described preferred embodiments and the modifications thereof may be combined appropriately as long as no conflict arises.

Preferred embodiments of the present invention are applicable, for example, to spindle motors and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus, the spindle motor comprising:
   a base plate; and
   a rotating portion rotatably supported by the base plate through a bearing mechanism; wherein
   the base plate includes:
      a bottom plate portion arranged to extend perpendicularly or substantially perpendicularly to a rotation axis of the rotating portion; and
      a wall portion arranged to extend in an axial direction from a radially outer edge portion of the bottom plate portion;

the bottom plate portion includes:
  a cup portion including an upper surface recessed on a radially inner side of the wall portion; and
  an outer bottom plate portion arranged to extend between the cup portion and the wall portion;
the base plate includes:
  a first member made of a first type of metallic material; and
  a second member made of a second type of metallic material;
the second type of metallic material has a Young's modulus greater than that of the first type of metallic material;
the first member includes at least the wall portion;
the second member includes a plate-shaped portion arranged to define at least a portion of the outer bottom plate portion; and
the plate-shaped portion is arranged to extend perpendicularly or substantially perpendicularly to the rotation axis.

2. The spindle motor according to claim 1, wherein the first and second members are arranged to axially overlap with each other in the outer bottom plate portion.

3. The spindle motor according to claim 1, wherein the second member includes a strengthened region arranged to extend from an upper surface to a lower surface of the outer bottom plate portion.

4. The spindle motor according to claim 1, wherein
the cup portion includes an inner bottom plate portion arranged to extend perpendicularly or substantially perpendicularly to the rotation axis on a radially inner side of the outer bottom plate portion; and
the inner bottom plate portion is made of a metallic material having a Young's modulus greater than that of the first type of metallic material.

5. The spindle motor according to claim 4, wherein
the cup portion further includes an annular wall arranged to extend upward from a radially outer edge portion of the inner bottom plate portion; and
the annular wall is made of the second type of metallic material.

6. The spindle motor according to claim 4, wherein the inner bottom plate portion is made of the second type of metallic material.

7. The spindle motor according to claim 4, wherein
the first type of metallic material is a metallic material containing aluminum;
the second type of metallic material is an austenite stainless steel; and
the inner bottom plate portion is made of a ferrite or martensite stainless steel.

8. The spindle motor according to claim 6, wherein
the cup portion further includes an annular wall arranged to extend upward from a radially outer edge portion of the inner bottom plate portion; and
the annular wall is made of the second type of metallic material.

9. The spindle motor according to claim 8, wherein the second member is a single unitary member including the inner bottom plate portion, the annular wall, and at least a portion of the outer bottom plate portion.

10. The spindle motor according to claim 1, wherein
the plate-shaped portion includes a pair of circumferential edges each of which extends in a radial direction on a radially outer side of the cup portion; and
the plate-shaped portion is arranged to extend in a fan shape from one to the other of the pair of circumferential edges.

11. The spindle motor according to claim 10, wherein the plate-shaped portion further includes a rib arranged to project in the axial direction and extend in a circumferential direction or in a radial direction.

12. The spindle motor according to claim 1, wherein the plate-shaped portion is annular in a plan view.

13. The spindle motor according to claim 12, wherein the plate-shaped portion further includes a rib arranged to project in the axial direction and extend in a circumferential direction or in a radial direction.

14. The spindle motor according to claim 12, wherein
an upper surface of the plate-shaped portion includes a fan-shaped first upper surface and a fan-shaped second upper surface continuous with the first upper surface; and
the second upper surface is arranged at a level lower than that of the first upper surface.

15. The spindle motor according to claim 14, wherein the plate-shaped portion further includes a rib arranged to project in the axial direction and extend in a circumferential direction or in a radial direction.

16. The spindle motor according to claim 15, wherein
the upper surface of the plate-shaped portion is exposed at an upper surface of the outer bottom plate portion; and
the rib is provided in a lower surface of the plate-shaped portion.

17. The spindle motor according to claim 15, wherein
the upper surface of the plate-shaped portion is covered with the first member; and
the rib is provided in the upper surface or a lower surface of the plate-shaped portion.

18. The spindle motor according to claim 1, wherein
the first type of metallic material is pure aluminum or an aluminum alloy; and
the second type of metallic material is an austenite stainless steel.

19. The spindle motor according to claim 1, wherein
the first type of metallic material is pure aluminum or an aluminum alloy; and
the second type of metallic material is a ferrite stainless steel.

20. A disk drive apparatus comprising:
the spindle motor according to claim 1;
an access portion arranged to perform at least one of reading and writing of information from or to a disk supported by the rotating portion of the spindle motor; and
a cover arranged to cover an upper portion of the base plate; wherein
the rotating portion and the access portion are accommodated in a case defined by the base plate and the cover.

* * * * *